(12) United States Patent
Yokokawa et al.

(10) Patent No.: US 11,638,878 B2
(45) Date of Patent: May 2, 2023

(54) ALTITUDE-BASED DIFFICULTY ADJUSTMENTS FOR MULTI-PLAYER GAMING INTERACTIVITY

(71) Applicant: Sony Interactive Entertainment Inc., Tokyo (JP)

(72) Inventors: Yutaka Yokokawa, Belmont, CA (US); Jorge Arroyo Palacios, Livermore, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/364,635

(22) Filed: Jun. 30, 2021

(65) Prior Publication Data
US 2023/0001305 A1 Jan. 5, 2023

(51) Int. Cl.
*A63F 13/67* (2014.01)
*A63F 13/798* (2014.01)
*A63F 13/216* (2014.01)
*A63B 24/00* (2006.01)
*A63F 13/847* (2014.01)

(52) U.S. Cl.
CPC .......... *A63F 13/67* (2014.09); *A63B 24/0084* (2013.01); *A63F 13/216* (2014.09); *A63F 13/798* (2014.09); *A63F 13/847* (2014.09); *A63F 2300/205* (2013.01); *A63F 2300/6027* (2013.01)

(58) Field of Classification Search
CPC ...... A63F 13/67; A63F 13/216; A63F 13/798; A63F 13/847; A63F 2300/205; A63F 2300/6027; A63B 24/0084
See application file for complete search history.

(56) References Cited

U.S. PATENT DOCUMENTS

| | | | |
|---|---|---|---|
| 7,359,121 B2 * | 4/2008 | French | A63B 24/0087 73/79 |
| 8,425,295 B2 * | 4/2013 | Ballas | A63F 13/79 703/2 |
| 2006/0211462 A1 * | 9/2006 | French | A63F 13/211 463/1 |
| 2009/0291726 A1 * | 11/2009 | Svensson | G01S 5/0072 463/7 |
| 2010/0062818 A1 * | 3/2010 | Haughay, Jr. | A63F 13/245 482/8 |

(Continued)

Primary Examiner — Seng H Lim
(74) Attorney, Agent, or Firm — Penilla IP, APC

(57) ABSTRACT

A method for dynamic adjustment of interactive game play includes identifying a game session for a game played between first and second players, with the first and second players being connected from geographic locations having first and second elevations, respectively. The method also includes determining an objective in the game that the first and second players are predicted to achieve, and identifying a first path to be traversed by the first player to reach the objective in the game and identifying a second path to be traversed by the second player to reach the objective in the game. Each of the first and second paths includes a respective plurality of game actions to be accomplished by the first and second players. The method further includes adjusting a physical activity rating of select ones of the respective plurality of game actions based on a difference between the first and second elevations.

20 Claims, 11 Drawing Sheets

(56) References Cited

U.S. PATENT DOCUMENTS

| | | | | |
|---|---|---|---|---|
| 2010/0198453 | A1* | 8/2010 | Dorogusker | G06F 1/1626 |
| | | | | 340/427 |
| 2011/0098928 | A1* | 4/2011 | Hoffman | A63B 71/0697 |
| | | | | 702/5 |
| 2012/0046113 | A1* | 2/2012 | Ballas | A63F 13/00 |
| | | | | 463/43 |
| 2017/0080330 | A1* | 3/2017 | Laurila | G09B 29/10 |
| 2018/0290057 | A1* | 10/2018 | Mullins | A63F 13/216 |
| 2019/0247717 | A1* | 8/2019 | Winterbottom | G06Q 50/22 |
| 2020/0384351 | A1* | 12/2020 | Asano | G06F 3/0481 |
| 2020/0391104 | A1* | 12/2020 | Nakamura | A63F 13/216 |
| 2021/0052975 | A1* | 2/2021 | Shiba | A63F 13/35 |

* cited by examiner

ALTITUDE-BASED DIFFICULTY ADJUSTMENTS FOR MULTI-PLAYER GAMING INTERACTIVITY

BACKGROUND

In interactive game play, e.g., a one-on-one gaming challenge between two users, it is often the case that the users are playing from different geographic locations. In some of these cases, the difference in geographic location can have a significant impact on the game play. For example, if one user is proximate to the beach, e.g., in San Diego, Calif., and the other user is proximate to the mountains, e.g., in Denver, Colo., it will be more difficult for the user in Denver to perform physical game actions, e.g., jumping and ducking in a shooting game, because of the effect that high altitude has on the body.

Similarly, in the case of a physical training application, if the user is at a geographic location having a relatively high altitude, e.g., Denver, the user will have to work harder during the physical training than other users performing the physical training at a geographic location having a relatively low altitude, e.g., San Diego.

It is in this context that embodiments arise.

SUMMARY

In an example embodiment, a method for dynamic adjustment of interactive game play is provided. The method includes identifying a game session for a game played between a first player and a second player, with the first player being connected from a geographic location having a first elevation and the second player connected from a geographic location having a second elevation. The method also includes determining an objective in the game that the first player and the second player are predicted to achieve, and identifying a first path to be traversed by the first player to reach the objective in the game and identifying a second path to be traversed by the second player to reach the objective in the game. Each of the first path and the second path includes a respective plurality of game actions to be accomplished by the first player and the second player. The method further includes adjusting a physical activity rating of select ones of the respective plurality of game actions based on a difference between the first elevation and the second elevation.

In one embodiment, the first elevation is higher than the second elevation, and the adjusting the physical activity rating of select ones of the respective plurality of game actions based on the difference between the first elevation and the second elevation includes decreasing the physical activity rating of select ones of the plurality of game actions to be accomplished by the first player relative to the physical activity rating of select ones of the plurality of game actions to be accomplished by the second player. In one embodiment, the physical activity rating of select ones of the plurality of game actions to be accomplished by the first player is decreased relative to the physical activity rating of select ones of the plurality of game actions to be accomplished by the second player so as to define an activity adjustment gap, with the activity adjustment gap being configured to compensate for the difference in elevation between the first elevation and the second elevation so that a physiological effect on the first player resulting from performance of the game actions by the first player to reach the objective in the game is approximately the same as the physiological effect on the second player resulting from performance of the game actions by the second player to reach the objective in the game.

In one embodiment, the first elevation is higher than the second elevation, and the adjusting the physical activity rating of select ones of the respective plurality of game actions based on the difference between the first elevation and the second elevation includes increasing the physical activity rating of select ones of the plurality of games actions to be accomplished by the second player relative to the physical activity rating of select ones of the plurality of game actions to be accomplished by the first player. In one embodiment, the physical activity rating of select ones of the plurality of game actions to be accomplished by the second player is increased relative to the physical activity rating of select ones of the plurality of game actions to be accomplished by the first player so as to define an activity adjustment gap, with the activity adjustment gap being configured to compensate for the difference in elevation between the first elevation and the second elevation so that the game actions to be performed by the second player to reach the objective in the game feel approximately the same as the game actions to be performed by the first player to reach the objective in the game.

In one embodiment, the adjusting the physical activity rating of select ones of the respective plurality of game actions based on the difference between the first elevation and the second elevation includes adjusting the physical activity rating of select ones of the plurality of games actions to be accomplished by the first player and adjusting the physical activity rating of select ones of the plurality of game actions to be accomplished by the second player. In one embodiment, the physical activity rating of select ones of the plurality of game actions to be accomplished by the first player and the physical activity rating of select ones of the plurality of game actions to be accomplished by the second player are adjusted so as to define an activity adjustment gap, with the activity adjustment gap being configured to compensate for the difference in elevation between the first elevation and the second elevation so that a physiological effect on the first player resulting from performance of the game actions by the first player to reach the objective in the game is approximately the same as the physiological effect on the second player resulting from performance of the game actions by the second player to reach the objective in the game.

In one embodiment, the first elevation is higher than the second elevation, and the activity adjustment gap is defined by decreasing the physical activity rating of select ones of the respective plurality of game actions to be accomplished by the first player and increasing the physical activity rating of select ones of the respective plurality of game actions to be accomplished by the second player. In one embodiment, the first elevation is higher than the second elevation, and the activity adjustment gap is defined by decreasing the physical activity rating of select ones of the respective plurality of game actions to be accomplished by the second player and increasing the physical activity rating of select ones of the respective plurality of game actions to be accomplished by the first player.

In one embodiment, the method for dynamic adjustment of interactive game play further includes updating the first path to be traversed by the first player to reach the objective in the game and updating the second path to be traversed by the second player to reach the objective in the game. Each of the updated first path and the updated second path includes a respective plurality of updated game actions to be accomplished by the first player and the second player. Still further, the method includes adjusting a physical activity rating of select ones of the respective plurality of updated game actions based on a difference between the first elevation and the second elevation.

In another example embodiment, a computer readable medium containing non-transitory program instructions for dynamic adjustment of interactive game play is provided. The execution of the program instructions by one or more processors of a computer system causes the one or more processors to carry out operations of a method for dynamic adjustment of interactive game play. The method operations include identifying a game session for a game played between a first player and a second player, with the first player being connected from a geographic location having a first elevation and the second player connected from a geographic location having a second elevation. The method operations also include determining an objective in the game that the first player and the second player are predicted to achieve, and identifying a first path to be traversed by the first player to reach the objective in the game and identifying a second path to be traversed by the second player to reach the objective in the game. Each of the first path and the second path includes a respective plurality of game actions to be accomplished by the first player and the second player. The method operations further include adjusting a physical activity rating of select ones of the respective plurality of game actions based on a difference between the first elevation and the second elevation.

In one embodiment, the first elevation is higher than the second elevation, and the adjusting the physical activity rating of select ones of the respective plurality of game actions based on the difference between the first elevation and the second elevation includes decreasing the physical activity rating of select ones of the plurality of game actions to be accomplished by the first player relative to the physical activity rating of select ones of the plurality of game actions to be accomplished by the second player. In one embodiment, the physical activity rating of select ones of the plurality of game actions to be accomplished by the first player is decreased relative to the physical activity rating of select ones of the plurality of game actions to be accomplished by the second player so as to define an activity adjustment gap, with the activity adjustment gap being configured to compensate for the difference in elevation between the first elevation and the second elevation so that a physiological effect on the first player resulting from performance of the game actions by the first player to reach the objective in the game is approximately the same as the physiological effect on the second player resulting from performance of the game actions by the second player to reach the objective in the game.

In one embodiment, the first elevation is higher than the second elevation, and the adjusting the physical activity rating of select ones of the respective plurality of game actions based on the difference between the first elevation and the second elevation includes increasing the physical activity rating of select ones of the plurality of games actions to be accomplished by the second player relative to the physical activity rating of select ones of the plurality of game actions to be accomplished by the first player. In one embodiment, the physical activity rating of select ones of the plurality of game actions to be accomplished by the second player is increased relative to the physical activity rating of select ones of the plurality of game actions to be accomplished by the first player so as to define an activity adjustment gap, with the activity adjustment gap being configured to compensate for the difference in elevation between the first elevation and the second elevation so that the game actions to be performed by the second player to reach the objective in the game feel approximately the same as the game actions to be performed by the first player to reach the objective in the game.

In one embodiment, the adjusting the physical activity rating of select ones of the respective plurality of game actions based on the difference between the first elevation and the second elevation includes adjusting the physical activity rating of select ones of the plurality of games actions to be accomplished by the first player and adjusting the physical activity rating of select ones of the plurality of game actions to be accomplished by the second player. In one embodiment, the physical activity rating of select ones of the plurality of game actions to be accomplished by the first player and the physical activity rating of select ones of the plurality of game actions to be accomplished by the second player are adjusted so as to define an activity adjustment gap, with the activity adjustment gap being configured to compensate for the difference in elevation between the first elevation and the second elevation so that a physiological effect on the first player resulting from performance of the game actions by the first player to reach the objective in the game is approximately the same as the physiological effect on the second player resulting from performance of the game actions by the second player to reach the objective in the game.

In one embodiment, the first elevation is higher than the second elevation, and the activity adjustment gap is defined by decreasing the physical activity rating of select ones of the respective plurality of game actions to be accomplished by the first player and increasing the physical activity rating of select ones of the respective plurality of game actions to be accomplished by the second player. In one embodiment, the first elevation is higher than the second elevation, and the activity adjustment gap is defined by decreasing the physical activity rating of select ones of the respective plurality of game actions to be accomplished by the second player and increasing the physical activity rating of select ones of the respective plurality of game actions to be accomplished by the first player.

In one embodiment, the operations of the method for dynamic adjustment of interactive game play further include updating the first path to be traversed by the first player to reach the objective in the game and updating the second path to be traversed by the second player to reach the objective in the game. Each of the updated first path and the updated second path includes a respective plurality of updated game actions to be accomplished by the first player and the second player. Still further, the operations of the method include adjusting a physical activity rating of select ones of the respective plurality of updated game actions based on a difference between the first elevation and the second elevation Other aspects and advantages of the disclosures herein will become apparent from the following detailed description, taken in conjunction with the accompanying drawings, which illustrate by way of example the principles of the disclosures.

DETAILED DESCRIPTION

Figure 1:
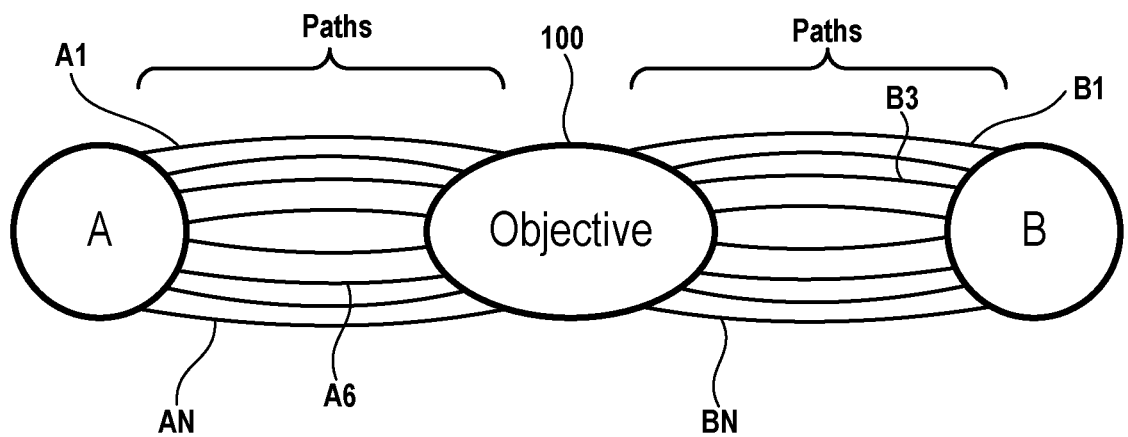
FIG. 1 is a simplified schematic diagram that illustrates various paths that players can take during a gaming session of a video game.

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

As is well known to those skilled in the art, video games can be implemented in several modes including console-only mode, online gaming mode, and streaming mode. In console-only mode, the video game is typically executed by the game console from a game disc, e.g., an optical disc. In online gaming mode, the video game is executed by the game console from either a game disc or a downloaded version of the game. Further, in online gaming mode, the console is in communication with an online game server and receives updates regarding other online players via the online game server. In streaming mode, the video game is executed in the cloud by an online game server, which processes the user inputs and transmits video frames back to the user for display on the user's device, e.g., a desktop computer, a laptop computer, a tablet computer, or a smartphone.

In online gaming mode and streaming mode, a player in a first location, e.g., New York, can interactively play a video game with a player in a second location, e.g., California, because both players are in communication with an online game server. Such interactive game play is not possible in console-only mode because the console is not in communication with an online game server. In online gaming mode and streaming mode, players in different locations can interactively play a variety of video games including, by way of example, first-person shooter games, target games, and racing games. In such video games, the players typically have to manipulate a controller, e.g., press buttons, move joysticks, etc., and perform physical actions to move the controller in the course of game play. For example, in a first-person shooter game in which the controller is configured to simulate a weapon, e.g., a laser gun, a player has to physically move the controller, e.g., up, down, left, and right, to aim the weapon and then has to either press a button or squeeze a trigger to fire the weapon. In addition, in the course of game play, the player might have to perform a number of physical actions, e.g., jumping to avoid an obstacle or ducking to hide from another player. In a racing game, a player has to manipulate the controller, which can be either a typical hand-held controller or a specialized steering wheel controller, to maneuver a vehicle along the pathway of a race. The player might also have to perform a physical action, e.g., leaning into a turn, to maintain control of the vehicle at certain points during the race.

In interactive game play, the physical actions required during game play typically do not pose a problem if the players are playing in similar environments. A problem can arise, however, if the players are playing the game in significantly different environments. For example, in the case of a one-on-one gaming challenge, if one player is playing from a geographic location having a relatively low elevation, e.g., San Diego, Calif., and the other player is playing from a geographic location having a relatively high elevation, e.g., Denver, Colo., the player in San Diego will have an advantage over the player in Denver because it will be harder for the player in Denver to perform the required physical gaming actions because of the effect that high altitude has on the body.

At a relatively high elevation, e.g., an elevation of at least about 5,000 feet above sea level, physical activity is more difficult than at relatively low elevations because the body essentially gets less oxygen per breath taken. This lack of oxygen is not the result of there being less oxygen in the air (regardless of elevation, air contains about 21% oxygen and about 78% nitrogen), but instead is due to reduced barometric pressure and thus reduced partial pressure of oxygen. To breathe in air without undue strain, the outside air pressure must be higher than the air pressure in the lungs. Thus, at high altitudes where the outside air pressure is lower than the air pressure inside the lungs, it becomes more difficult to pull air into the lungs and more difficult to pump oxygen throughout the body. As a result, a variety of physiological effects on the body can occur at high elevations including, for example, increased heart rate, increased blood pressure, breathlessness, fatigue, and headaches.

Embodiments of the present invention provide a method of interactive game play in which the gaming system can dynamically adjust the difficulty level of gaming actions to be performed by the players during the course of game play. By dynamically adjusting the difficulty level of certain gaming actions, the gaming system can prevent one player from gaining a competitive advantage relative to another player on the basis of geographic location. For example, as will be explained in more detail below, to keep the players on equal footing for competition, the gaming system can adjust the difficulty of gaming actions to be performed by a player in Denver, which has a relatively high elevation, relative to the difficulty of gaming actions to be performed by a player located in San Diego, which has a relatively low elevation.

FIG. 1 is a simplified schematic diagram that illustrates various paths that players can take during a gaming session of a video game. As shown in FIG. 1, from location A, a player can take any of available paths A1 to AN to reach objective 100 in the video game. From location B, a player can take any of available paths B1 to BN to reach objective 100 in the video game. The objective 100 can be any goal state associated with game play during a gaming session of the video game. By way of example, in a first-person shooter game, the objective 100 can be a battleground where the players are to engage in a battle. In a target game, the objective 100 can be the last target in a series of targets that the players must hit before they can advance to another level of the video game. In a racing game, the objective 100 can be the finish line of a racetrack. In one embodiment, the player at location A takes path A6 to objective 100 and the player at location B takes path B3 to objective 100, as described in more detail below with reference to FIGS. 2 and 3.

Figure 2:
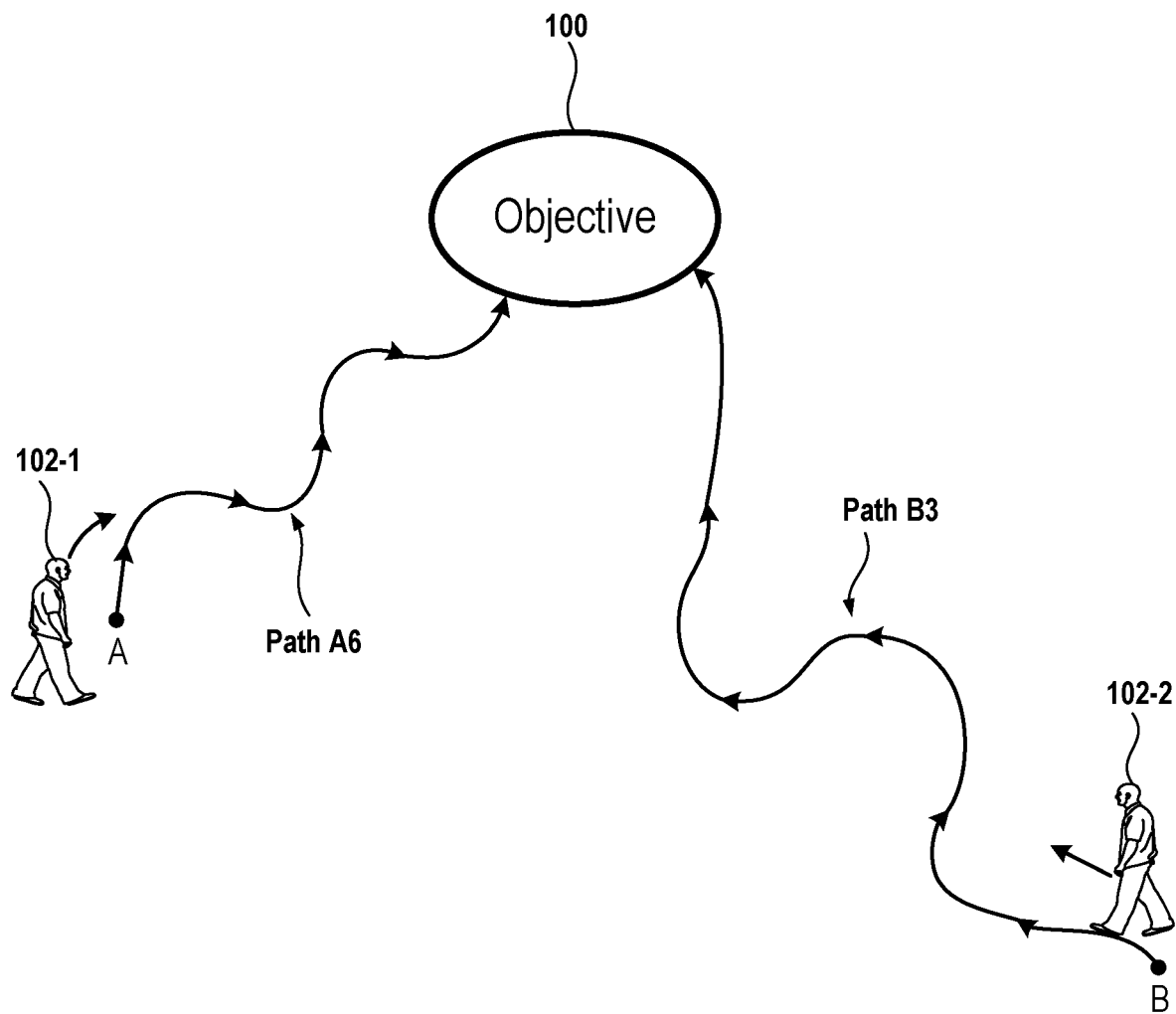
FIG. 2 is a simplified schematic diagram that illustrates the paths taken by two players to reach an objective in a video game during a gaming session.

FIG. 2 is a simplified schematic diagram that illustrates the paths taken by two players to reach an objective in a video game during a gaming session. In the example embodiment shown in FIG. 2, player 102-1 ("the first player") and player 102-2 ("the second player") are playing a first-person shooter game in which the players must travel from their respective locations to objective 100, which is a battleground at which they will engage in a battle against one another. To reach objective 100, the first player traverses from location A to the objective along path A6 and the second player traverses from location B to the objective along path B3. As the first player traverses path A6 from location A to the objective 100, the first player will have to perform a number of game actions to maneuver through the game scene, which can include terrain, buildings, vehicles, creatures, objects, etc. Similarly, as the second player traverses path B3 from location B to the objective 100, the second player will have to perform a number of game actions to maneuver through the game scene. Additional details regarding the game actions to be performed by the players are set forth below with reference to, e.g., FIGS. 5A and 5B.

Figure 3:
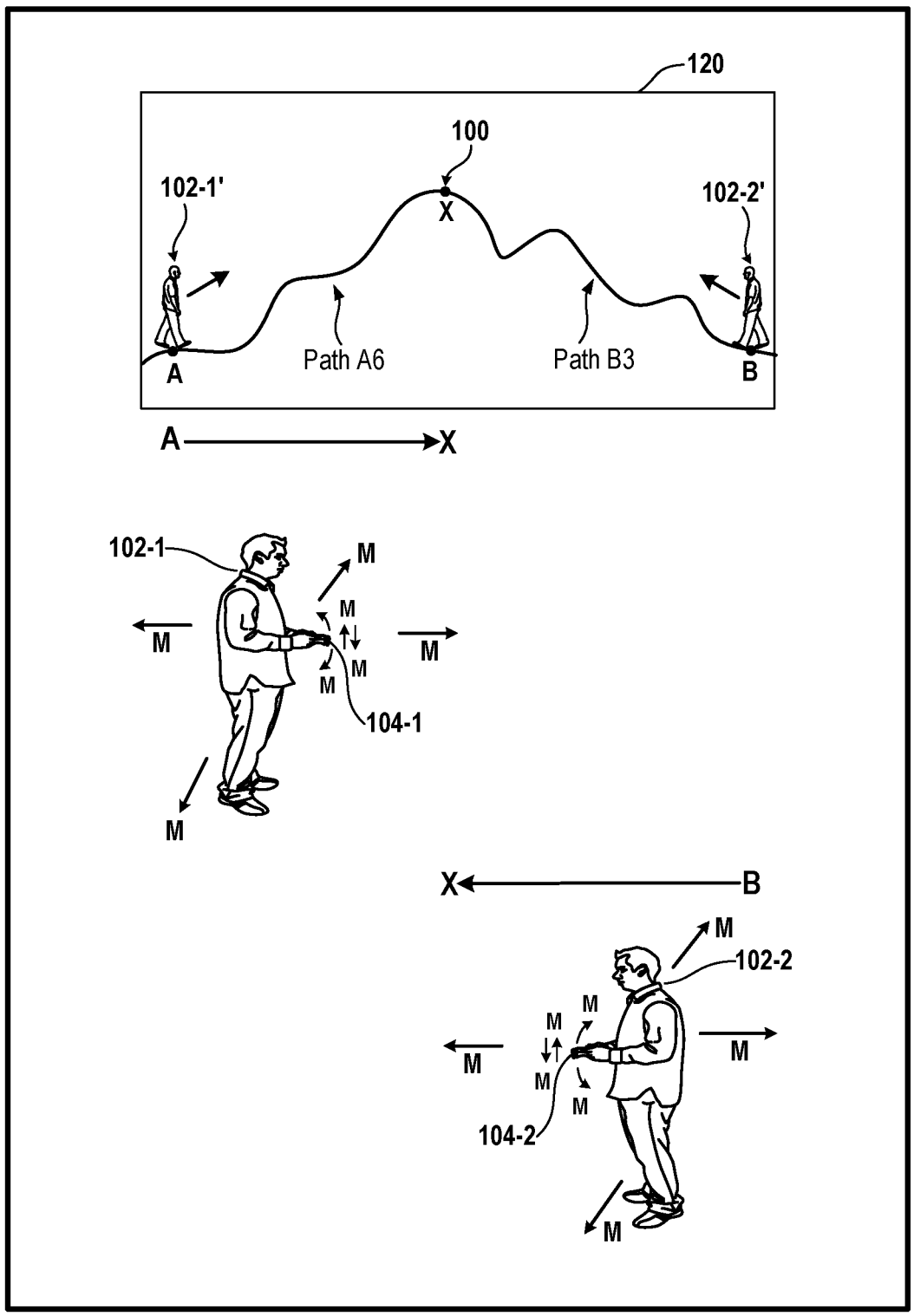
FIG. 3 is a simplified schematic diagram that illustrates a game scene in which players perform game actions while traversing a path to reach an objective in a video game during a gaming session.

FIG. 3 is a simplified schematic diagram that illustrates a game scene in which players perform game actions while traversing a path to reach an objective in a video game during a gaming session. As shown in FIG. 3, game scene 120 includes player 102-1 ("the first player"), who is represented in the game scene by avatar 102-1', player 102-2 ("the second player"), who is represented in the game scene by avatar 102-2', and objective 100. The game scene 120 can be displayed on any suitable display device including, by way of example, a head mounted display (HMD), a computer monitor, or other screen (e.g., the screen of a laptop computer, a tablet computer, or a smartphone). In the example embodiment of FIG. 3, objective 100 is a battleground at which the first and second players will engage in a battle against one another. To reach the battleground at location X, the first player traverses from location A to location X along path A6 and the second player traverses from location B to location X along path B3. As the first player traverses from location A to location X, the first player will have to perform a number of game actions to address situations that arise in the game scene 120. Similarly, as the second player traverses from location B to location X, the second player will have to perform a number of game actions to address situations that arise in the game scene 120.

To perform game actions, in one embodiment, the first player (player 102-1) uses a controller 104-1 and the second player (player 102-2) uses a controller 104-2. The controllers 104-1 and 104-2 wirelessly transmit signals to the associated gaming system with which the controller is in communication. As is well known to those skilled in the art, each of the controllers can include an assortment of buttons, e.g., selection buttons, direction buttons, and trigger buttons, one or more joysticks, a microphone, and an inertial sensor. Each controller wirelessly transmits signals to the associated gaming system when one or more buttons are pressed as well as when one of the joysticks is moved. In addition, data from the inertial sensor in each of the controllers is wirelessly transmitted to the associated gaming system to track the position (x-y-z axes), orientation (pitch, roll, yaw), and physical movement of each of the controllers.

The players can perform some game actions by pressing a button (or a combination of buttons) on their respective controller or by moving a joystick (or joysticks) on their respective controller. The players can perform other game actions by physically moving their respective controller. For example, as shown in FIG. 3, the first player (player 102-1) and the second player (player 102-2) can move their respective controllers 104-1 and 104-2 in the directions indicated by the arrows labeled M. The directions indicated by the arrows labeled M include forward and backward, left and right, up and down, as well as rotating around an axis (e.g., a vertical axis defined by the body of the particular player). Additional details regarding the game actions performed by the first player as the first player traverses from location A to location X along path A6 are set forth below with reference to FIG. 5A. Additional details regarding the game actions performed by the second player as the second player traverses from location B to location X along path B3 are set forth below with reference to FIG. 5B.

In one embodiment, the method for dynamic adjustment of interactive game play includes identifying a game session for a game played between a first player, who is connected from a geographic location having a first elevation, and second player, who is connected from a geographic location having a second elevation. The gaming system, in one embodiment, performs a geographic lookup to determine the elevation of the geographic location from which each player is connected to the game. If the gaming system determines that the players are connected to the game from geographic locations having significantly different elevations, the game session between the players is identified as a game session that requires dynamic adjustment of the game play to prevent one player from having a competitive advantage over the other player because they are playing in different environments.

To dynamically adjust interactive game play for an identified game session, the method, in one embodiment, includes determining an objective in the game that the first and second player are predicted to achieve. For example, the objective in the game can be reaching a battleground at which the players will engage in a battle against one another, e.g., objective 100 at location X shown in FIG. 3. In one embodiment, the gaming system predicts the objective in the game that the players will achieve during the game session. The method also includes identifying the paths to be traversed by the players to reach the objective in the game. For example, as shown in FIG. 3, the first player (player 102-1 represented by avatar 102-1') traverses from location A to location X (the location of objective 100) along path A6 and the second player (player 102-2 represented by avatar 102-2') traverses from location B to location X along path B3.

Each of the respective paths to be traversed by the players to reach the objective in the game, e.g., path A6 for the first player and path B3 for the second player, includes a number of game actions to be accomplished by the players. To determine what dynamic adjustments to game play are to be made, the specific game actions anticipated to be accomplished by the players in the course of reaching the objective in the game needs to be determined.

Figure 4:
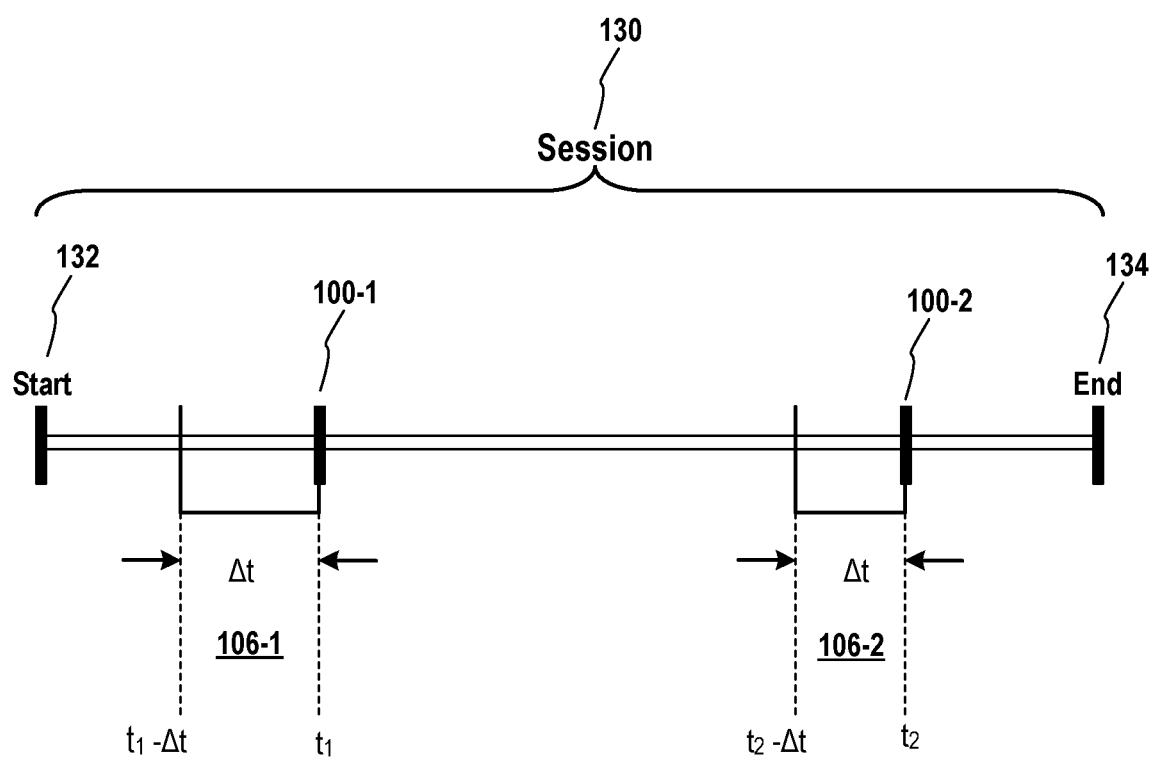
FIG. 4 is a schematic diagram that illustrates the use of a window of time to identify game actions to be accomplished to reach an objective in the game during a game session, in accordance with one embodiment.

FIG. 4 is a schematic diagram that illustrates the use of a window of time to identify game actions to be accomplished to reach an objective in the game during a game session, in accordance with one embodiment. As shown in FIG. 4, game session 130, in which game play begins at start 132 and finishes at end 134, includes objective 100-1 and objective 100-2, each of which is an objective in the video game to be reached by the players during the game session. For each objective, the gaming system starts at the objective and looks backward to determine what game actions each player is anticipated to perform to reach the objective. For example, in the case of objective 100-1, the gaming system starts at time $t_1$, which is the time at which a player is expected to reach the objective, and sets a window 106-1 which defines a period of time, $\Delta t$, before time $t_1$. Thus, as can be seen in FIG. 4, window 106-1 starts at time $(t_1 - \Delta t)$ and ends at time $(t_1)$. Similarly, in the case of objective 100-2, window 106-2 starts at time $(t_2 - \Delta t)$ and ends at time $(t_2)$.

The length of time, $\Delta t$, for a window can be set based on the number of game actions the players are anticipated to perform to the reach the objective in the game. In one embodiment, the window is set to last for a period of time in which no more than about eight game actions are anticipated to be performed. In another embodiment, the window is set to last for a period of time in which no more than about four game actions are anticipated to be performed, e.g., two to four game actions. The actual length of time for which the window is set depends on the pace at which the game actions are to be performed in the course of game play during the game session. If the pace at which game actions are performed is relatively slow, then the window could be relatively wide, e.g., about five to ten minutes. On the other hand, if the pace at which game actions are performed is relatively fast, then the window could be relatively narrow, e.g., about one or two minutes. The upper limit of about eight game actions for a window specified above should not be considered to be an absolute limit because any number of game actions can be used to define the length of a window. However, as more game actions are included in the window, the degree of uncertainty associated with determining the sequence of game actions anticipated to be performed during the window significantly increases. Thus, at some point, the likelihood of correctly determining the sequence of game actions to be performed by a player during the window becomes so low that it might not justify the increased processing time required to perform the calculations associated with generating the sequence.

Once the window is set, in one embodiment, the specific game actions anticipated to be performed by the players during the course of game play in the window are determined. In the example shown in FIG. 3 in which objective 100 at location X is a battleground, the first player (player 102-1 represented by avatar 102-1') traverses from location A to location X (the location of objective 100) along path A6 and the second player (player 102-2 represented by avatar 102-2') traverses from location B to location X along path B3. In this example, the window is set to include the game actions to be performed by the first player as the first player traverses from location A to location X and the game actions to be performed by the second player as the second player traverses from location B to location X. In one embodiment, once the window is set, the gaming system determines the specific game actions that are anticipated to be performed by each player. The specific game actions anticipated to be performed by the first player as the first player traverses from location A to location X in the example of FIG. 3 are listed in FIG. 5A and additional details regarding these specific game actions are described below with reference to FIG. 5A. The specific game actions anticipated to be performed by the second player as the second player traverses from location B to location X in the example of FIG. 3 are listed in FIG. 5B and additional details regarding these specific game actions are described below with reference to FIG. 5B.

Figure 5A:
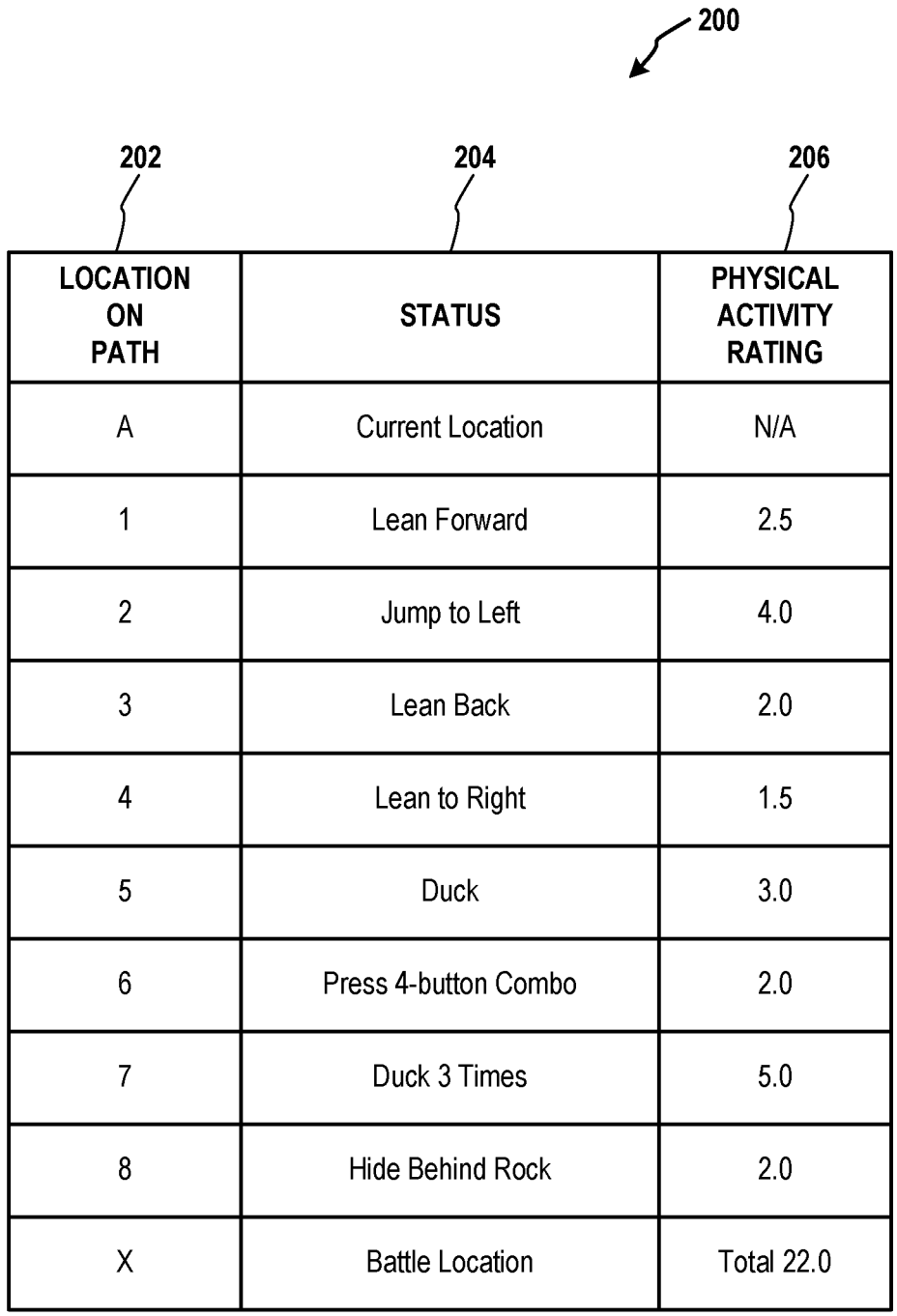
FIG. 5A is a chart illustrating game actions to be performed by a first player as the first player traverses a path to an objective in the game, in accordance with one embodiment.

FIG. 5A is a chart illustrating game actions to be performed by a first player as the first player traverses a path to an objective in the game, in accordance with one embodiment. As shown in FIG. 5A, chart 200 includes three columns column 202; column 204; and column 206. Column 202, which includes the heading "location on path," lists the locations on the path to be traversed by the first player, e.g., in the example of FIG. 3. In this example, the locations on the path include location A, locations 1 through 8, and location X. Column 204, which includes the heading "status," specifies the status of the first player at each the corresponding locations listed in column 202. In one embodiment, if the first player is not performing a game action at the corresponding location, the status entry can specify the significance of this location. In the example of FIG. 3, the first player starts from location A and traverses path A6 to location X. As such, in column 204, the status of location A is indicated as "current location" and the status of location X is indicated as "battle location." If the first player is anticipated to perform a game action at the corresponding location, the status entry can specify the specific game action that is anticipated to be performed at this location. Specific game actions are listed in column 204 for each of locations 1 through 8 along the path from location A to location X. For example, the status of location 1 is specified as "lean forward," which indicates that the first player is anticipated to perform a game action that includes leaning forward at location 1. The status of location 3 is specified as "lean back," which indicates that the first player is anticipated to perform a game action that includes leaning back at location 3. The status of location 7 is specified as "duck 3 times," which indicates that the first player is anticipated to perform a game action that includes ducking 3 times at location 7.

Column 206, which includes the heading "physical activity rating," specifies a physical activity rating for each game action that is anticipated to be performed by the first player at the corresponding location. The physical activity rating is a rating that quantifies the physical activity required to perform a game action. In one embodiment, the physical activity rating is based on a combination of the game itself and information regarding historical game play, e.g., information regarding game actions obtained from inertial sensors in game controllers. In one embodiment, game actions that do not require much physical activity, e.g., pressing a button, moving a joystick, leaning, and hiding behind an object, are assigned relatively low physical activity ratings, e.g., a rating in the range of 1.5 to 2.5 on a scale of 10.0. Game actions that require a substantial amount of physical activity, e.g., jumping and ducking, are assigned relatively high physical activity ratings. For example, as shown in chart 200 of FIG. 5A, the game action of jumping to the left (see location 2 in chart 200) is assigned a physical activity rating of 4.0 and the game action of ducking 3 times (see location 7 in chart 200) is assigned a physical activity rating of 5.0. It will be apparent to those skilled in the art that the physical activity ratings assigned to game actions can be varied from the examples specified herein to suit the needs of particular applications.

Figure 5B:
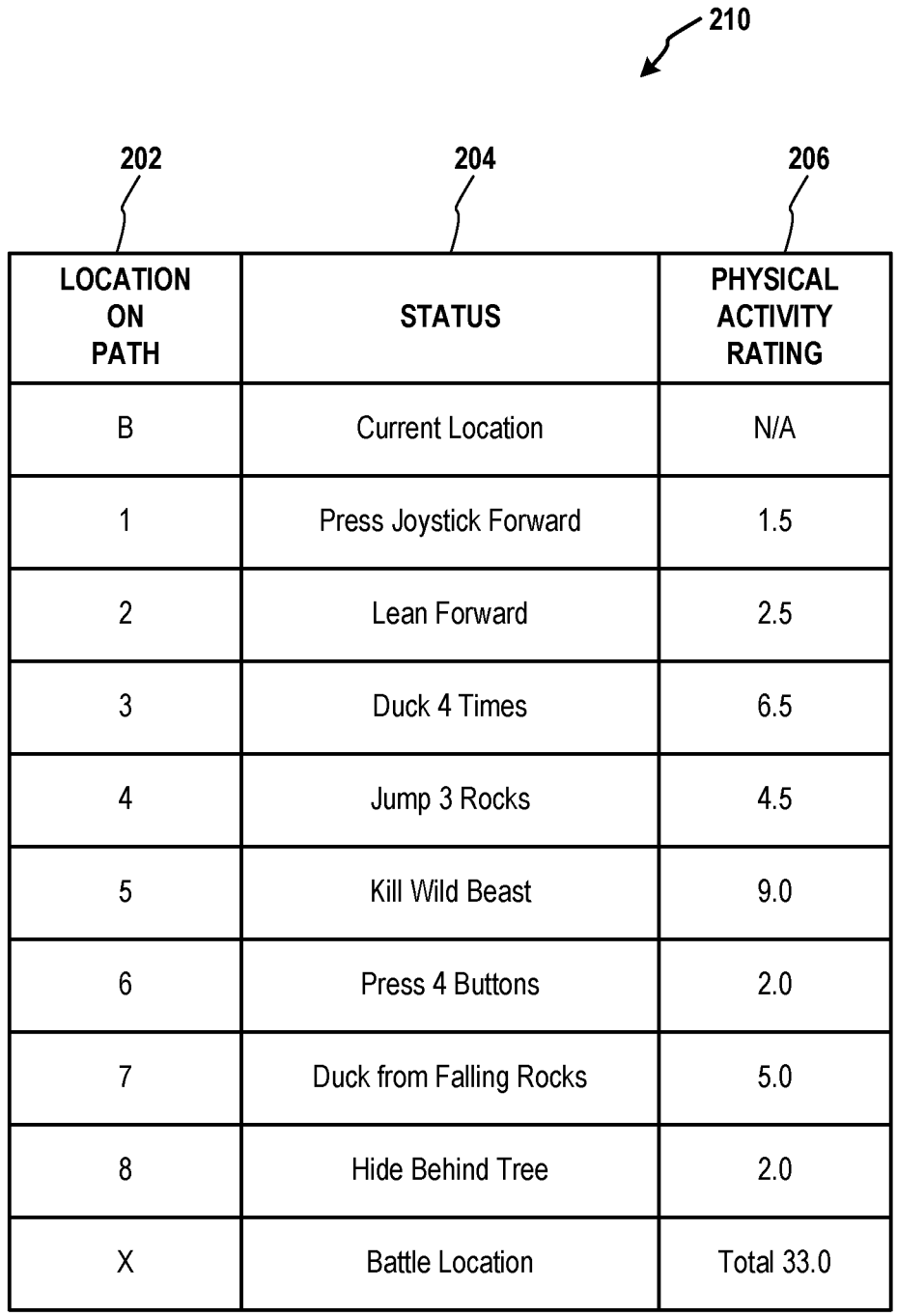
FIG. 5B is a chart illustrating game actions to be performed by a second player as the second player traverses a path to an objective in the game, in accordance with one embodiment.

FIG. 5B is a chart illustrating game actions to be performed by a second player as the second player traverses a path to an objective in the game, in accordance with one embodiment. As shown in FIG. 5B, chart 210 includes the same three columns included in chart 200 shown in FIG. 5A, namely column 202, column 204, and column 206. Column 202, which includes the heading "location on path," lists the locations on the path to be traversed by the second player, e.g., in the example of FIG. 3. In this example, the locations on the path include location B, locations 1 through 8, and location X. Column 204, which includes the heading "status," specifies the status of the second player at each the corresponding locations listed in column 202. In the example of FIG. 3, the second player starts from location B and traverses path B3 to location X. The description of the status entry in column 204 set forth above with reference to FIG. 5A also applies to FIG. 5B. Thus, in column 204, the status of location B is indicated as "current location" and the status of location X is indicated as "battle location." Additionally, specific game actions are listed in column 204 of FIG. 5B for each of locations 1 through 8 along the path from location B to location X. For example, the status of location 1 is specified as "press joystick forward," which indicates that the second player is anticipated to perform a game action that includes pressing the joystick forward at location 1. The status of location 4 is specified as "jump 3 rocks," which indicates that the second player is anticipated to perform a game action that includes jumping 3 rocks at location 3. The status of location 8 is specified as "hide behind tree," which indicates that the second player is anticipated to perform a game action that includes hiding behind a tree at location 8.

Column 206 of chart 210 (see FIG. 5B) specifies the physical activity rating for each game action that is anticipated to be performed by the second player at the corresponding location. The game action of pressing a joystick forward (see location 1 in chart 210) has a physical activity rating of 1.5 (on a scale of 10.0), which indicates that this game action does not require much physical activity. Other game actions listed in chart 210 which have relatively low physical activity ratings include leaning forward at location 2 (physical activity rating of 2.5), pressing 4 buttons at location 6 (physical activity rating of 2.0), and hiding behind a tree (physical activity rating of 2.0). The game action of ducking 4 times (see location 3 in chart 210) has a physical activity rating of 6.5, which indicates that this game action requires a substantial amount of physical activity. Other game actions listed in chart 210 which have relatively high physical activity ratings include ducking 4 times at location 3 (physical activity rating of 6.5), jumping 3 rocks at location 4 (physical activity rating of 4.5), killing a wild beast at location 5 (physical activity rating of 9.0), and ducking from falling rocks at location 7 (physical activity rating of 5.0).

In each of chart 200 (see FIG. 5A) and chart 210 (see FIG. 5B), a total of eight game are actions are listed. In the example of FIG. 3, which is reflected in each of charts 200 and 210, the window was set to include the game actions to be performed by the first and second players as they respectively traverse from location A to location X and from location B to location X. Using this window, the gaming system determined that the first and second players will likely have to perform the specified eight game actions listed in charts 200 and 210, respectively, to reach objective 100 (the battleground) at location X. As there is a degree of uncertainty associated with calculating a sequence of eight game actions anticipated to be performed by the players, the likelihood of correctly determining the sequence of game actions to be performed by the players during the window can be relatively low in some circumstances. Thus, in situations where a higher degree of accuracy is preferable, the window can be set to be narrower so that the window includes fewer game actions. In one embodiment, the window is set to include the game actions to be performed by the first player as the first player traverses from location C to location X, where location C is located closer to location X than location A. In this embodiment, the window includes four game actions to be performed by the first player as the first player traverses from location C to location X. Likewise, the window can be set to include the game actions to be performed by the second player as the second player traverses from location D to location X, where location D is located closer to location X than location B. In this embodiment, the window includes four game actions to be performed by the second player as the second player traverses from location D to location X. In other embodiments, the window can be set so that even fewer game actions, e.g., two game actions, are included in the window.

In the event the first player and the second player are playing from geographic locations having significantly different environments, e.g., significantly different elevations, the method for dynamic adjustment of interactive game player includes adjusting the physical activity rating of certain game actions based on the difference between the elevation of the first player's location and the elevation of the second player's location. The goal of adjusting the physical activity rating of certain game actions is to prevent one player from gaining a competitive advantage relative to another player on the basis of geographic location. Thus, the adjusting of the physical activity rating of certain game actions can be accomplished in a number of ways. In one embodiment, the physical activity rating of certain game actions for one player is increased. In another embodiment, the physical activity rating of certain game actions for one player is decreased. In other embodiments, the physical activity rating of certain game actions for both players is adjusted. Additional details regarding the adjusting of the physical activity rating for certain game actions are described below with reference to FIGS. 6A to 6D.

Figure 6A:
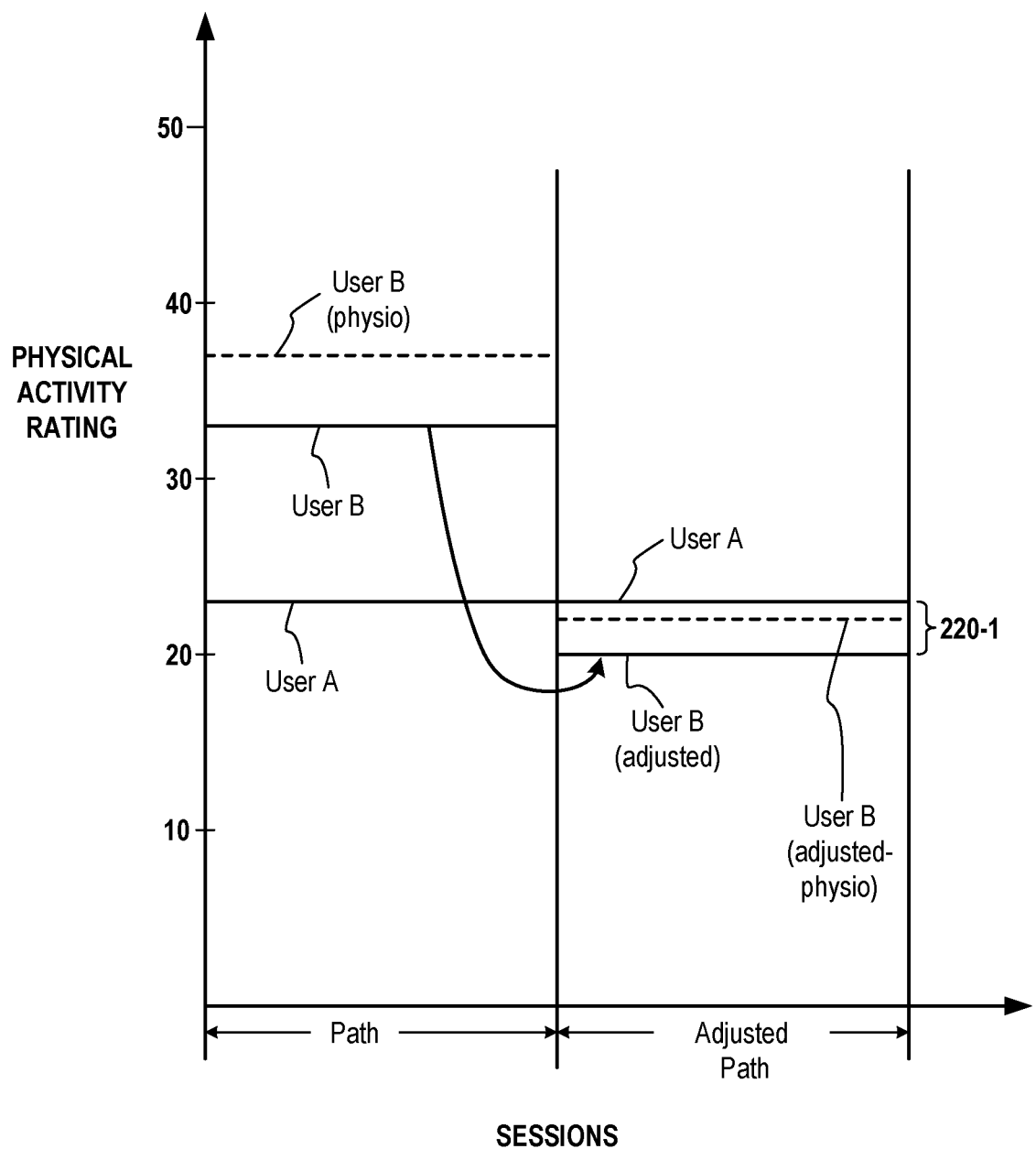
FIG. 6A is a diagram that illustrates the physical activity rating of certain game actions being decreased for one player, in accordance with one embodiment.

FIG. 6A is a diagram that illustrates the physical activity rating of certain game actions being decreased for one player, in accordance with one embodiment. As shown in FIG. 6A, the total physical activity rating for the game actions to be performed by user B as user B traverses a path during a game session is 33.0, as indicated by the line labeled "User B" in the column labeled "path" on the left side of FIG. 6A. The total physical activity rating of 33.0 shown for user B corresponds to the total physical activity rating of 33.0 shown in FIG. 5B for the second player in the example of FIG. 3. As such, the total physical activity rating of 33.0 represents the sum of the physical activity ratings for a number of game actions. The total physical activity rating for the game actions to be performed by user A as user A traverses a path during a game session is 22.0, as indicated by the line labeled "User A" in the column labeled "path" on the left side of FIG. 6A. The total physical activity rating of 22.0 shown for user A corresponds to the total physical activity rating of 22.0 shown in FIG. 5A for the first player in the example of FIG. 3. As such, the total physical activity rating of 22.0 represents the sum of the physical activity ratings for a number of game actions.

In the embodiment shown in FIG. 6A, user B is playing from Denver, Colo., which has a relatively high elevation estimated to about 5,283 feet above sea level. User A is playing from San Diego, Calif., which has a relatively low elevation estimated to be about 49 feet above sea level. In light of the difference in elevation between their locations, user B will have to work harder than user A to perform the physical activities associated with the game actions making up the total physical activity rating for each user due to the above-discussed effects that high altitude has on the body. In connection with the description provided herein, the terms "elevation" and "altitude" are used interchangeably to refer to the distance either an object or a place is located above a reference point, e.g., mean sea level. To account for the increased difficulty in performing physical activities at a relatively high elevation, an elevation adjustment factor is applied to the total physical activity rating for user B. In the embodiment of FIG. 6A in which the elevation difference between user B and user A is roughly 5,200 feet, an elevation adjustment factor of 10% is applied to the total physical activity rating for user B. The application of the elevation adjustment factor to the total physical activity rating for user B is indicated in FIG. 6A by the dashed line labeled "User B (physio)" in the column labeled "path" on the left side of FIG. 6A. This dashed line indicates a total physical activity rating of 36.3, which is the sum of the original total physical activity rating of 33.0 and the 10% elevation adjustment factor of 3.3. In other embodiments, the elevation adjustment factor can be modified to be either greater than or less than 10% based on the elevation difference between the users. By way of example, if the elevation difference is less impactful than an elevation difference of about 5,200 feet, an elevation adjustment factor of about 5% can be used. On the other hand, if the elevation difference is more impactful than an elevation difference of about 5,200 feet, an elevation adjustment factor of about 15% can be used.

In the embodiment of FIG. 6A, if user A and user B were to engage in a one-on-one gaming challenge, user A would have a competitive advantage over user B because user B would have to work much harder to traverse the path to the objective in the game (user B would have to perform game actions with an adjusted total physical activity of 36.3 whereas user A would have to perform game actions with a total physical activity rating of just 22.0). Thus, to prevent user A from having a competitive advantage over user B, the total physical activity rating for the game actions to be performed by user B is decreased relative to the total physical activity rating for the game actions to be performed by user A. In particular, as shown in FIG. 6A, the total physical activity rating for user B is reduced from 33.0 to 20.0, as indicated by the arrow that points to the line labeled "User B (adjusted)" in the column labeled "adjusted path" on the right side of FIG. 6A. This decrease of the total physical activity rating for user B results in the formation of an activity adjustment gap 220-1, which is defined between the line labeled "User B (adjusted)" and the line labeled "User A" in the column labeled "adjusted path" on the right side of FIG. 6A. In one embodiment, the activity adjustment gap 220-1 is configured to compensate for the difference in elevation between the users so that the physiological effect on the users resulting from the performance of game actions to reach the objective in the game will be approximately the same for each user. In the embodiment of FIG. 6A, when the elevation adjustment factor of 10% is applied to the adjusted physical activity rating of 20.0 for user B to account for the relatively high elevation at user B's location, the resulting elevation-adjusted physical activity rating for user B is 22.0, which is the sum of the decreased physical activity rating of 20.0 plus and the 10% elevation adjustment factor of 2.0. The resulting elevation-adjusted physical activity rating of 22.0 for user B is indicated in FIG. 6A by the dashed line labeled "User B (adjusted-physio)" in the column labeled "adjusted path" on the right side of FIG. 6A.

As can be seen in FIG. 6A, both the resulting elevation-adjusted physical activity rating for user B and the total physical activity rating for user A are 22.0. (In this regard, it is noted that dashed line labeled "User B (adjusted-physio)" and the line labeled "User A" are shown in FIG. 6A as being slightly separated from one another for ease of illustration.) Thus, if user A and user B were to engage in a one-on-one gaming challenge using the adjusted paths, user A would no longer have a competitive advantage over user B because both user A and user B would be doing approximately the same amount of work to traverse their respective paths to the objective in the game. In particular, user A would have to perform game actions with a total physical activity rating of 22.0 and user B would have to perform game actions with a total physical activity rating of 20.0, which is the equivalent of a total physical activity rating of 22.0 when the 10% elevation adjustment factor is applied.

In the example of FIG. 6A, the total physical activity rating for user B is decreased from 33.0 to 20.0 to prevent user A from having a competitive advantage over user B due to the difference in elevation. In one embodiment, this decrease is accomplished by adjusting select ones of the plurality of game actions to be accomplished by user B along the path to the objective to the game. By way of example, the game action of "ducking 4 times," which has a physical activity rating of 6.5 (see location 3 in FIG. 5B), could be changed to the game action of "ducking 3 times," which has a physical activity rating of 5.0 (see location 7 in FIG. 5A), to reduce the amount of physical activity required to perform this action. To complete the decrease in total physical activity rating for user B, other game actions to be performed can be adjusted to have decreased physical activity ratings until the reduced total physical activity rating of 20.0 is achieved. In other embodiments in which the physical activity ratings for select game actions are increased, the game actions can be changed to increase the amount of physical activity required to perform the game actions. By way of example, the game action of "ducking 3 times" could be changed to the game action of "ducking 4 times" to increase the total physical activity rating for a sequence of game actions to be performed along a path to the objective in the game.

Figure 6B:
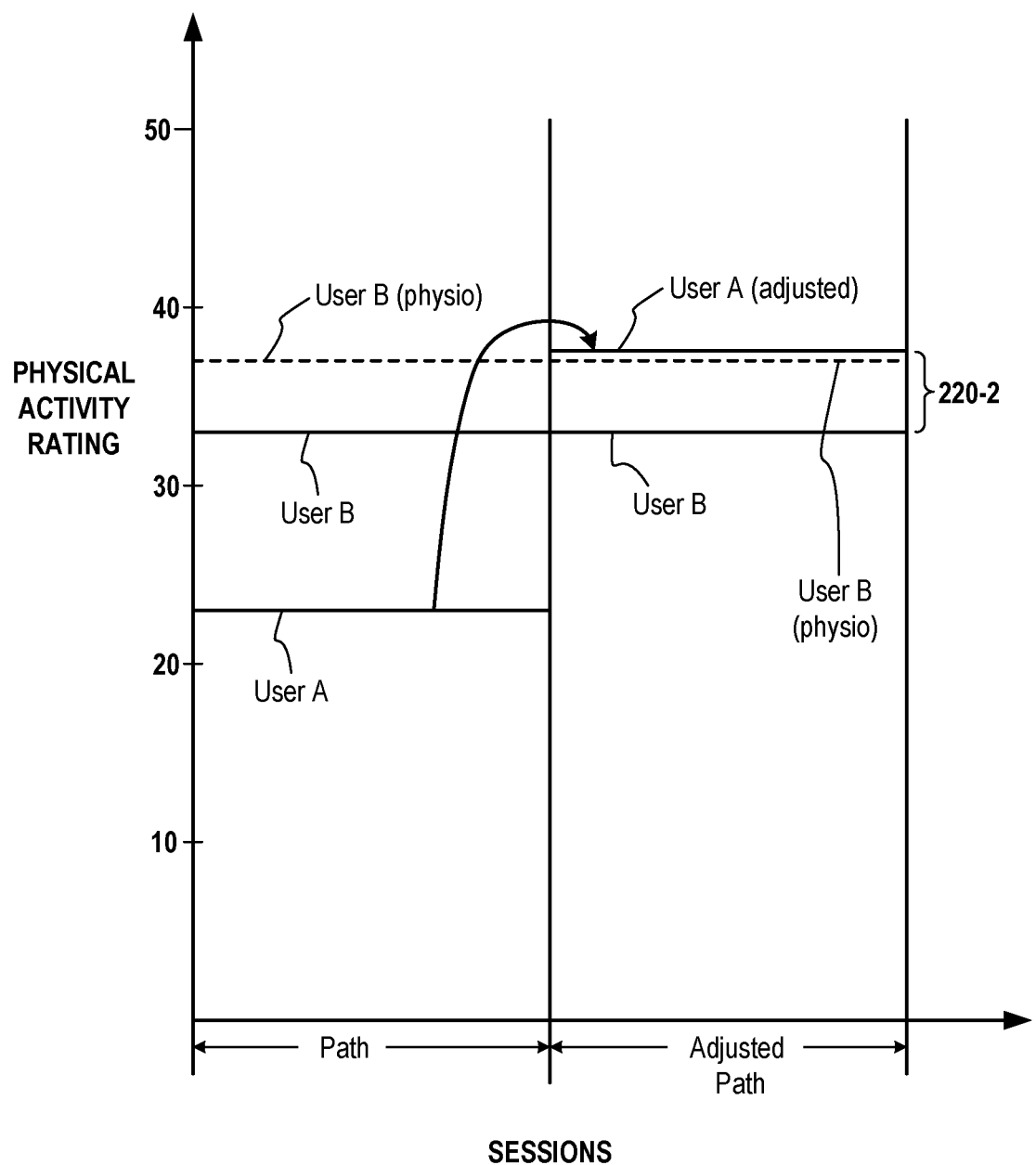
FIG. 6B is a diagram that illustrates the physical activity rating of certain game actions being increased for one player, in accordance with one embodiment.

FIG. 6B is a diagram that illustrates the physical activity rating of certain game actions being increased for one player, in accordance with one embodiment. The information in the column labeled "path" on the left side of FIG. 6B is the same as the information in the column labeled "path" on the left side of FIG. 6A. In particular, the total physical activity rating for the game actions to be performed by user B as user B traverses a path during a game session is 33.0, as indicated by the line labeled "User B." The total physical activity rating of 33.0 shown for user B corresponds to the total physical activity rating of 33.0 shown in FIG. 5B for the second player in the example of FIG. 3. The total physical activity rating for the game actions to be performed by user A as user A traverses a path during a game session is 22.0, as indicated by the line labeled "User A." The total physical activity rating of 22.0 shown for user A corresponds to the total physical activity rating of 22.0 shown in FIG. 5A for the first player in the example of FIG. 3. The dashed line labeled "User B (physio)" indicates a total physical activity rating of 36.3, which is the sum of the original total physical activity rating of 33.0 for user B and the 10% elevation adjustment factor of 3.3 (because, as noted above, user B is playing from Denver, Colo.).

In the embodiment of FIG. 6B, to prevent user A from having a competitive advantage over user B, the total physical activity rating for the game actions to be performed by user A is increased relative to the total physical activity rating for the game actions to be performed by user B. In particular, as shown in FIG. 6B, the total physical activity rating for user A is increased from 22.0 to 36.3, as indicated by the arrow that points to the line labeled "User A (adjusted)" in the column labeled "adjusted path" on the right side of FIG. 6B. This increase of the total physical activity rating for user A results in the formation of an activity adjustment gap 220-2, which is defined between the line labeled "User A (adjusted)" and the line labeled "User B" in the column labeled "adjusted path" on the right side of FIG. 6B. In one embodiment, the activity adjustment gap 220-2 is configured to compensate for the difference in elevation between the users so that the physiological effect on the users resulting from the performance of game actions to reach the objective in the game will be approximately the same for each user. In the embodiment of FIG. 6B, when the elevation adjustment factor of 10% is applied to the total physical activity rating of 33.0 for user B to account for the relatively high elevation at user B's location, the elevation-adjusted physical activity rating for user B is 36.3, which is the sum of the total physical activity rating of 33.0 and the 10% elevation adjustment factor of 3.3. The elevation-adjusted physical activity rating of 36.3 for user B is indicated in FIG. 6B by the dashed line labeled "User B (physio)" in the column labeled "adjusted path" on the right side of FIG. 6B.

As can be seen in FIG. 6B, both the adjusted physical activity rating for user A and the elevation-adjusted physical activity rating for user B are 36.3. (In this regard, it is noted that dashed line labeled "User B (physio)" and the line labeled "User A (adjusted)" are shown in FIG. 6B as being slightly separated from one another for ease of illustration.) Thus, if user A and user B were to engage in a one-on-one gaming challenge using the adjusted paths, user A would no longer have a competitive advantage over user B because both user A and user B would be doing approximately the same amount of work to traverse their respective paths to the objective in the game. In particular, user A would have to perform game actions with a total physical activity rating of 36.3 and user B would have to perform game actions with a total physical activity rating of 33.0, which is the equivalent of a total physical activity rating of 36.3 when the 10% elevation adjustment factor is applied.

Figure 6C:
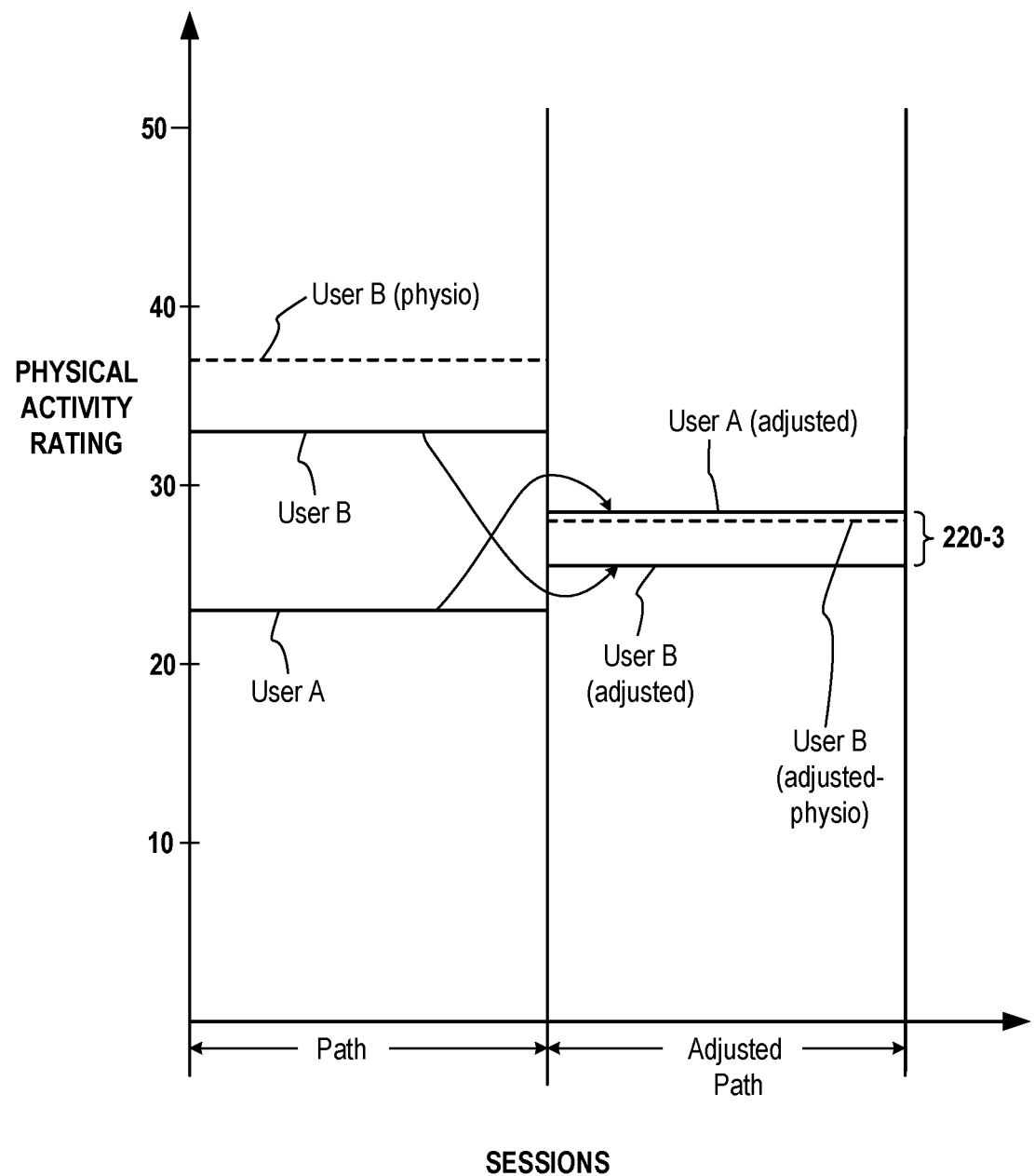
FIG. 6C is a diagram that illustrates the physical activity rating of certain game actions being adjusted for both players, in accordance with one embodiment.

FIG. 6C is a diagram that illustrates the physical activity rating of certain game actions being adjusted for both players, in accordance with one embodiment. The information in the column labeled "path" on the left side of FIG. 6C is the same as the information in the column labeled "path" on the left side of FIGS. 6A and 6B. In particular, the total physical activity rating for the game actions to be performed by user B as user B traverses a path during a game session is 33.0, as indicated by the line labeled "User B." The total physical activity rating for the game actions to be performed by user A as user A traverses a path during a game session is 22.0, as indicated by the line labeled "User A." The dashed line labeled "User B (physio)" indicates a total physical activity rating of 36.3, which is the sum of the original total physical activity rating of 33.0 for user B and the 10% elevation adjustment factor of 3.3 (because, as noted above, user B is playing from Denver, Colo.).

In the embodiment of FIG. 6C, to prevent user A from having a competitive advantage over user B, the total physical activity rating for the game actions to be performed by user A is increased and the total physical activity rating for the game actions to be performed by user B is decreased. In particular, as shown in FIG. 6C, the total physical activity rating for user A is increased from 22.0 to 27.5, as indicated by the arrow that points to the line labeled "User A (adjusted)" in the column labeled "adjusted path" on the right side of FIG. 6C. The total physical activity rating for user B is decreased from 33.0 to 25, as indicated by the arrow that points to the line labeled "User B (adjusted)" in the column labeled "adjusted path" on the right side of FIG. 6C. The adjustments to the total physical activity ratings for user A and user B results in the formation of an activity adjustment gap 220-3, which is defined between the line labeled "User A (adjusted)" and the line labeled "User B (adjusted)" in the column labeled "adjusted path" on the right side of FIG. 6C. In one embodiment, the activity adjustment gap 220-3 is configured to compensate for the difference in elevation between the users so that the physiological effect on the users resulting from the performance of game actions to reach the objective in the game will be approximately the same for each user. In the embodiment of FIG. 6C, when the elevation adjustment factor of 10% is applied to the adjusted (decreased) physical activity rating of 25.0 for user B to account for the relatively high elevation at user B's location, the elevation-adjusted physical activity rating for user B is 27.5, which is the sum of the adjusted (decreased) physical activity rating of 25.0 and the 10% elevation adjustment factor of 2.5. The elevation-adjusted physical activity rating of 27.5 for user B is indicated in FIG. 6C by the dashed line labeled "User B (adjusted-physio)" in the column labeled "adjusted path" on the right side of FIG. 6C.

As can be seen in FIG. 6C, both the adjusted (increased) physical activity rating for user A and the adjusted (decreased) and elevation-adjusted physical activity rating for user B are 27.5. (In this regard, it is noted that dashed line labeled "User B (adjusted-physio)" and the line labeled "User A (adjusted)" are shown in FIG. 6C as being slightly separated from one another for ease of illustration.) Thus, if user A and user B were to engage in a one-on-one gaming challenge using the adjusted paths, user A would no longer have a competitive advantage over user B because both user A and user B would be doing approximately the same amount of work to traverse their respective paths to the objective in the game. In particular, user A would have to perform game actions with a total physical activity rating of 27.5 and user B would have to perform game actions with a total physical activity rating of 25.0, which is the equivalent of a total physical activity rating of 27.5 when the 10% elevation adjustment factor is applied.

As described above, in the embodiment of FIG. 6C, the physical activity rating of game actions is adjusted for both users. As such, this technique is not as straightforward as the embodiments of FIGS. 6A and 6B in which the physical activity rating of game actions is adjusted for just one user. Nonetheless, the embodiment of FIG. 6C can be particularly useful in certain situations. For example, if adjusting the total physical activity rating for one user results in a sequence of game actions that is either too difficult for the user, e.g., the user is a lesser skilled player, or too easy for the user, e.g., the user is a highly skilled player, adjusting the physical activity ratings of game actions for both users can result in more enjoyable game play for both users without one user having a competitive advantage over the other user.

Figure 6D:
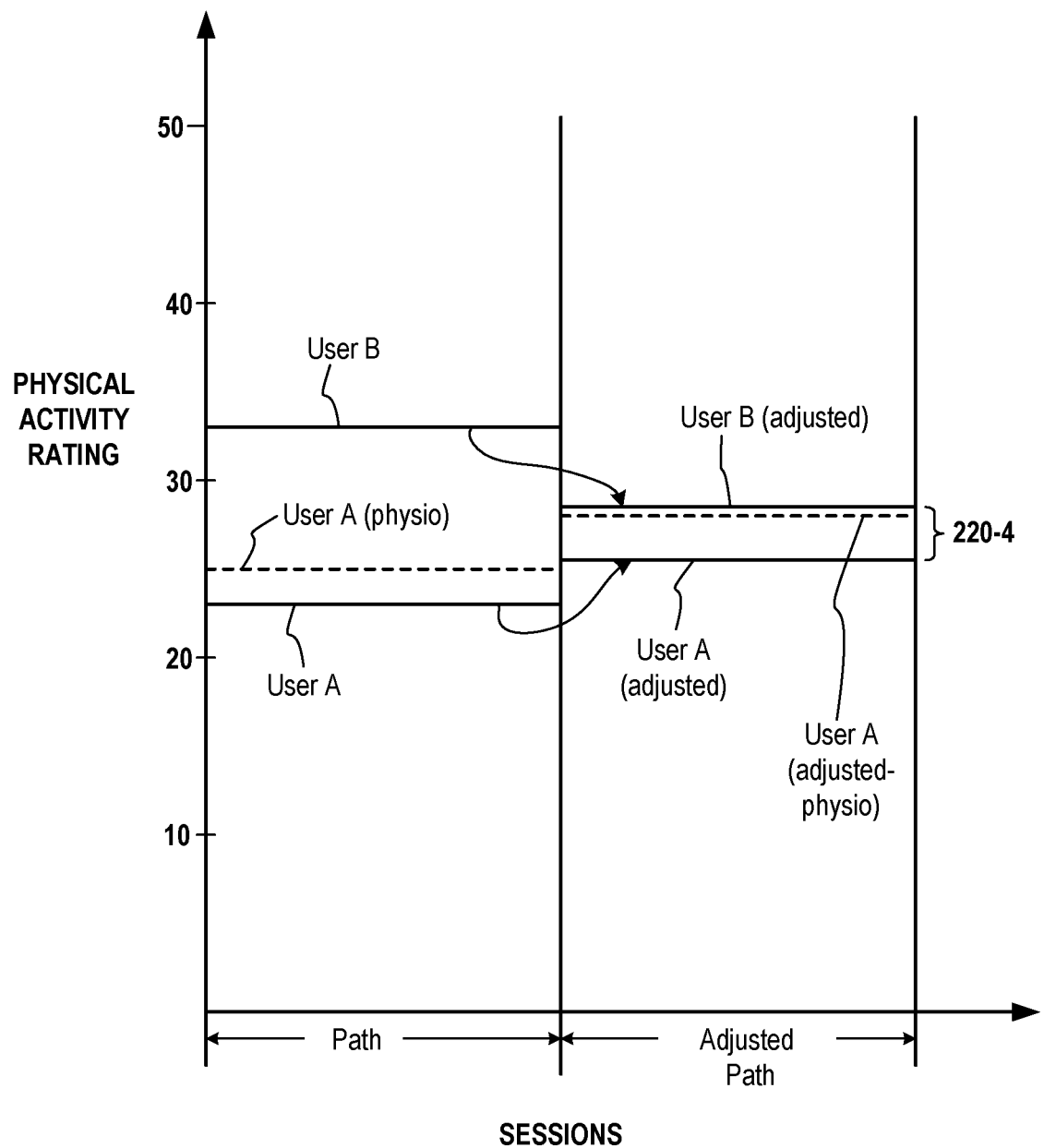
FIG. 6D is a diagram that illustrates the physical activity rating of certain game actions being adjusted for both players, in accordance with another embodiment.

FIG. 6D is a diagram that illustrates the physical activity rating of certain game actions being adjusted for both players, in accordance with another embodiment. The embodiment shown in FIG. 6D is the same as the embodiment shown in FIG. 6C, except that the geographic locations from which the users are playing have been switched. As such, in the embodiment of FIG. 6D, user A is playing from Denver, Colo. (a relatively high elevation) and user B is playing from San Diego, Calif. (a relatively low elevation). As shown in FIG. 6D, the total physical activity rating for the game actions to be performed by user B as user B traverses a path during a game session is 33.0, as indicated by the line labeled "User B." The total physical activity rating for the game actions to be performed by user A as user A traverses a path during a game session is 22.0, as indicated by the line labeled "User A." The dashed line labeled "User A (physio)" indicates a total physical activity rating of 24.2, which is the sum of the original total physical activity rating of 22.0 for user A and the 10% elevation adjustment factor of 2.2 (because, as noted above, user A is playing from Denver, Colo. in this embodiment).

In the embodiment of FIG. 6D, to prevent user A from having a competitive advantage over user B, the total physical activity rating for the game actions to be performed by user A is increased and the total physical activity rating for the game actions to be performed by user B is decreased. In particular, as shown in FIG. 6D, the total physical activity rating for user A is increased from 22.0 to 25.5, as indicated by the arrow that points to the line labeled "User A (adjusted)" in the column labeled "adjusted path" on the right side of FIG. 6D. The total physical activity rating for user B is decreased from 33.0 to 28.0, as indicated by the arrow that points to the line labeled "User B (adjusted)" in the column labeled "adjusted path" on the right side of FIG. 6D. The adjustments to the total physical activity ratings for user A and user B results in the formation of an activity adjustment gap 220-4, which is defined between the line labeled "User A (adjusted)" and the line labeled "User B (adjusted)" in the column labeled "adjusted path" on the right side of FIG. 6D. In one embodiment, the activity adjustment gap 220-4 is configured to compensate for the difference in elevation between the users so that the physiological effect on the users resulting from the performance of game actions to reach the objective in the game will be approximately the same for each user. In the embodiment of FIG. 6D, when the elevation adjustment factor of 10% is applied to the adjusted (increased) physical activity rating of 25.5 for user A to account for the relatively high elevation at user A's location, the elevation-adjusted physical activity rating for user A is 28.05, which is the sum of the adjusted (increased) physical activity rating of 25.5 and the 10% elevation adjustment factor of 2.5. The elevation-adjusted physical activity rating of 28.05 for user A is indicated in FIG. 6D by the dashed line labeled "User A (adjusted-physio)" in the column labeled "adjusted path" on the right side of FIG. 6D.

As can be seen in FIG. 6D, both the adjusted (increased) and elevation-adjusted physical activity rating for user A and the adjusted (decreased) physical activity rating for user B are essentially the same (user A is 28.05 and user B is 28.0). (In this regard, it is noted that dashed line labeled "User B (adjusted-physio)" and the line labeled "User A (adjusted)" are shown in FIG. 6D as being slightly separated from one another for ease of illustration.) Thus, if user A and user B were to engage in a one-on-one gaming challenge using the adjusted paths, user A would no longer have a competitive advantage over user B because both user A and user B would be doing approximately the same amount of work to traverse their respective paths to the objective in the game. In particular, user B would have to perform game actions with a total physical activity rating of 28.0 and user A would have to perform game actions with a total physical activity rating of 25.5, which is the equivalent of a total physical activity rating of 28.05 when the 10% elevation adjustment factor is applied.

In the course of game play, the gaming system can update the paths to be traversed by each player to reach the objective in the game. In one embodiment, the gaming system updates the paths to be traversed by a player each time the player performs a game action. If the game action performed by the player is different from the game action that the player was anticipated to perform, the gaming system recalculates the path that the player is expected to take to reach the objective in the game and updates the game actions that the player is anticipated to perform as the player traverses the updated path. In the event the physical activity rating of certain game actions needs to adjusted to account for a difference in elevation between the geographic locations of the players, the physical activity rating of select ones of the updated game actions can be adjusted.

It will be apparent to those skilled in the art that the elevation-based adjustments described herein in connection with interactive game play can be used in other contexts, e.g., physical training applications. For example, if a user is working out, e.g., on an inclined treadmill, using a physical training application that has user going up a fairly steep hill, the user at high altitude can have the application automatically change the user's view of the hill, which can be displayed to the user on a screen or a head mounted display (HMD), so that the hill appears to be less steep than it actually is. This visual adjustment can help the user remain motivated to continue going up the hill. In this same vein, in other embodiments, the application can also cause the sounds produced by the user, e.g., heavy breathing, to be modified to reflect normal breathing to give the user the impression that he is not working as hard as he actually is. This audio adjustment can help the user to remain motivated to continue working out. Further, the application can display an avatar to the user which is not breathing hard to give added motivation to the user.

The visual and audio adjustments to the environment described above can be used to get the user to feel as if the exercise task at hand is less difficult and therefore achievable. Additionally, in augmented scenarios, e.g., an augmented reality (AR) system, bio-feedback can be used to challenge the user to keep going during a workout. It must be kept in mind, however, that users at relatively high elevations are subject to physiological effects such as dizziness and nausea during exercise. Moreover, the onset of dizziness or nausea can be accelerated when there is a relatively wide gap between the psychological messaging being provided to the user, e.g., the exercise is relatively easy, and the physiological reality of the situation, e.g., the user is working relatively hard to perform the exercise. As such, the application should be capable of throttling back the appearance that a particular exercise is relatively easy when it appears that such action is needed, e.g., the user appears to be having a hard time with the exercise or the user appears to be on the verge of becoming nauseous.

Figure 7:
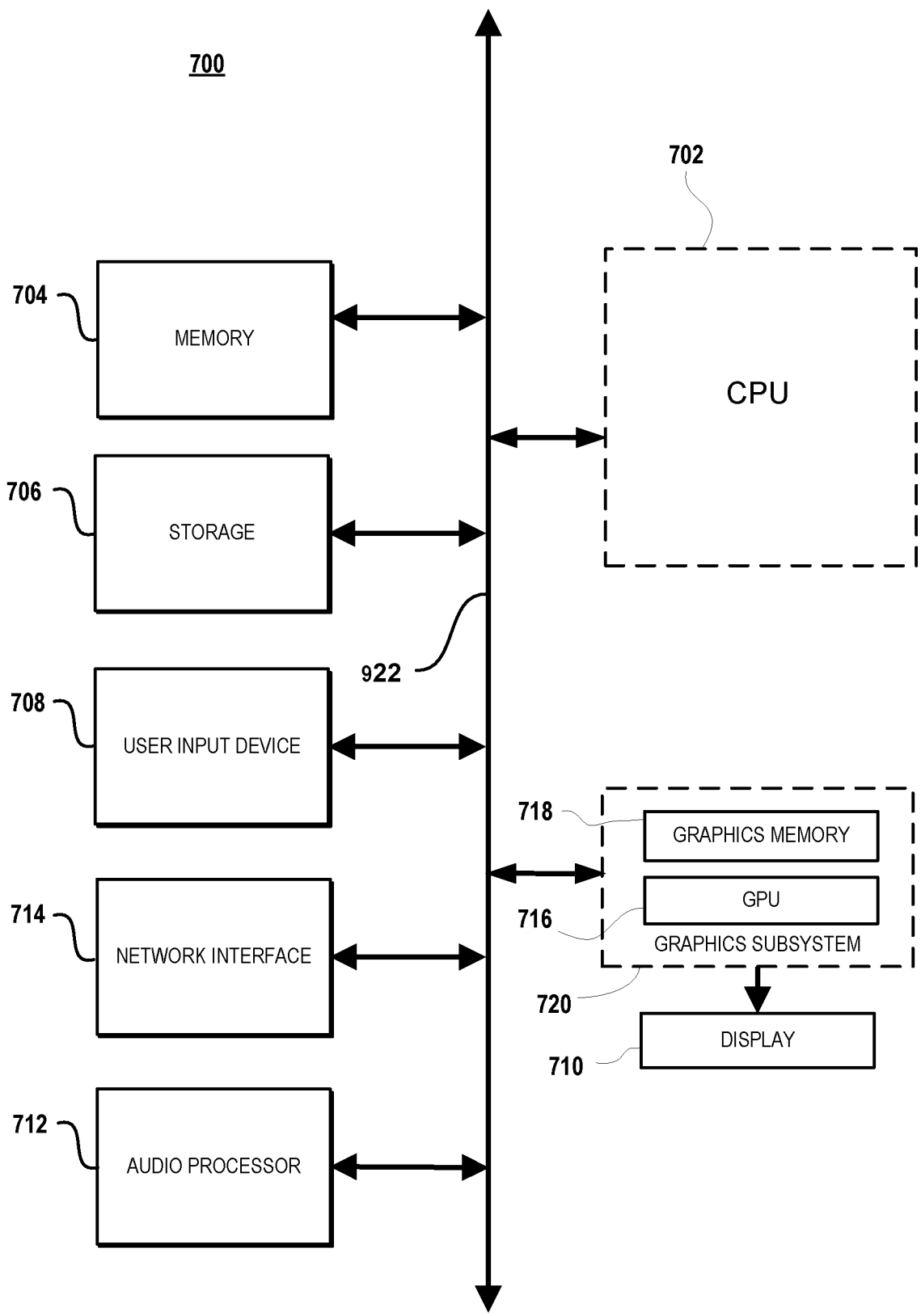
FIG. 7 is a schematic diagram of a computing system and components, which may be used in accordance with one or more embodiments of the disclosure.

FIG. 7 illustrates components of an example device 700 that can be used to perform aspects of the various embodiments of the present disclosure. This block diagram illustrates a device 700 that can incorporate or can be a personal computer, video game console, personal digital assistant, a server or other digital device, suitable for practicing an embodiment of the disclosure. Device 700 includes a central processing unit (CPU) 702 for running software applications and optionally an operating system. CPU 702 may be comprised of one or more homogeneous or heterogeneous processing cores. For example, CPU 702 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 700 may be a localized to a player playing a game segment (e.g., game console), or remote from the player (e.g., back-end server processor), or one of many servers using virtualization in a game cloud system for remote streaming of gameplay to clients.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, tracking devices for recognizing gestures, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 710, and audio processor 712 are connected via one or more data buses 722.

A graphics subsystem 720 is further connected with data bus 722 and the components of the device 700. The graphics subsystem 720 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 708, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 714 periodically outputs pixel data for an image from graphics memory 718 to be displayed on display device 710. Display device 710 can be any device capable of displaying visual information in response to a signal from the device 700, including CRT, LCD, plasma, and OLED displays. Device 700 can provide the display device 710 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although method operations may be described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Accordingly, the disclosure of the example embodiments is intended to be illustrative, but not limiting, of the scope of the disclosures, which are set forth in the following claims and their equivalents. Although example embodiments of the disclosures have been described in some detail for purposes of clarity of understanding, it will be apparent that certain changes and modifications can be practiced within the scope of the following claims. In the following claims, elements and/or steps do not imply any particular order of operation, unless explicitly stated in the claims or implicitly required by the disclosure.

What is claimed is:

1. A method for dynamic adjustment of interactive game play, comprising:
    identifying a game session for a game played between a first player and a second player, the first player connected from a geographic location having a first elevation and the second player connected from a geographic location having a second elevation;
    determining an objective in the game that the first player and the second player are predicted to achieve;
    identifying a first path to be traversed by the first player to reach the objective in the game and identifying a second path to be traversed by the second player to reach the objective in the game, each of the first path and the second path includes a respective plurality of game actions to be accomplished by the first player and the second player; and
    adjusting a physical activity rating of select ones of the respective plurality of game actions based on a difference between the first elevation and the second elevation, wherein adjusting the physical activity rating functions to dynamically change an amount of physical activity required for input to the game to accomplish one or more of the game actions.

2. The method of claim 1, wherein the first elevation is higher than the second elevation, and the adjusting the physical activity rating of select ones of the respective plurality of game actions based on the difference between the first elevation and the second elevation includes decreasing the physical activity rating of select ones of the plurality of game actions to be accomplished by the first player relative to the physical activity rating of select ones of the plurality of game actions to be accomplished by the second player.

3. The method of claim 2, wherein the physical activity rating of select ones of the plurality of game actions to be accomplished by the first player is decreased relative to the physical activity rating of select ones of the plurality of game actions to be accomplished by the second player so as to define an activity adjustment gap, the activity adjustment gap being configured to compensate for the difference in elevation between the first elevation and the second elevation so that a physiological effect on the first player resulting from performance of the game actions by the first player to reach the objective in the game is approximately the same as the physiological effect on the second player resulting from performance of the game actions by the second player to reach the objective in the game.

4. The method of claim 1, wherein the first elevation is higher than the second elevation, and the adjusting the physical activity rating of select ones of the respective plurality of game actions based on the difference between the first elevation and the second elevation includes increasing the physical activity rating of select ones of the plurality of games actions to be accomplished by the second player relative to the physical activity rating of select ones of the plurality of game actions to be accomplished by the first player.

5. The method of claim 4, wherein the physical activity rating of select ones of the plurality of game actions to be accomplished by the second player is increased relative to the physical activity rating of select ones of the plurality of game actions to be accomplished by the first player so as to define an activity adjustment gap, the activity adjustment gap being configured to compensate for the difference in elevation between the first elevation and the second elevation so that the game actions to be performed by the second player to reach the objective in the game feel approximately the same as the game actions to be performed by the first player to reach the objective in the game.

6. The method of claim 1, wherein the adjusting the physical activity rating of select ones of the respective plurality of game actions based on the difference between the first elevation and the second elevation includes adjusting the physical activity rating of select ones of the plurality of games actions to be accomplished by the first player and adjusting the physical activity rating of select ones of the plurality of game actions to be accomplished by the second player.

7. The method of claim 6, wherein the physical activity rating of select ones of the plurality of game actions to be accomplished by the first player and the physical activity rating of select ones of the plurality of game actions to be accomplished by the second player are adjusted so as to define an activity adjustment gap, the activity adjustment gap being configured to compensate for the difference in elevation between the first elevation and the second elevation so that a physiological effect on the first player resulting from performance of the game actions by the first player to reach the objective in the game is approximately the same as the physiological effect on the second player resulting from performance of the game actions by the second player to reach the objective in the game.

8. The method of claim 7, wherein the first elevation is higher than the second elevation, and the activity adjustment gap is defined by decreasing the physical activity rating of select ones of the respective plurality of game actions to be accomplished by the first player and increasing the physical activity rating of select ones of the respective plurality of game actions to be accomplished by the second player.

9. The method of claim 7, wherein the first elevation is higher than the second elevation, and the activity adjustment gap is defined by decreasing the physical activity rating of select ones of the respective plurality of game actions to be accomplished by the second player and increasing the physical activity rating of select ones of the respective plurality of game actions to be accomplished by the first player.

10. The method of claim 1, further comprising:
updating the first path to be traversed by the first player to reach the objective in the game and updating the second path to be traversed by the second player to reach the objective in the game, each of the updated first path and the updated second path includes a respective plurality of updated game actions to be accomplished by the first player and the second player; and
adjusting a physical activity rating of select ones of the respective plurality of updated game actions based on a difference between the first elevation and the second elevation.

11. A computer readable medium containing non-transitory program instructions for dynamic adjustment of interactive game play, wherein execution of the program instructions by one or more processors of a computer system causes the one or more processors to carry out the operations of:
identifying a game session for a game played between a first player and a second player, the first player connected from a geographic location having a first elevation and the second player connected from a geographic location having a second elevation;
determining an objective in the game that the first player and the second player are predicted to achieve;
identifying a first path to be traversed by the first player to reach the objective in the game and identifying a second path to be traversed by the second player to reach the objective in the game, each of the first path and the second path includes a respective plurality of game actions to be accomplished by the first player and the second player; and
adjusting a physical activity rating of select ones of the respective plurality of game actions based on a difference between the first elevation and the second elevation, wherein adjusting the physical activity rating functions to dynamically change an amount of physical activity required for input to the game to accomplish one or more of the game actions.

12. The computer readable medium of claim 11, wherein the first elevation is higher than the second elevation, and the adjusting the physical activity rating of select ones of the respective plurality of game actions based on the difference between the first elevation and the second elevation includes decreasing the physical activity rating of select ones of the plurality of game actions to be accomplished by the first player relative to the physical activity rating of select ones of the plurality of game actions to be accomplished by the second player.

13. The computer readable medium of claim 12, wherein the physical activity rating of select ones of the plurality of game actions to be accomplished by the first player is decreased relative to the physical activity rating of select ones of the plurality of game actions to be accomplished by the second player so as to define an activity adjustment gap, the activity adjustment gap being configured to compensate for the difference in elevation between the first elevation and the second elevation so that a physiological effect on the first player resulting from performance of the game actions by the first player to reach the objective in the game is approximately the same as the physiological effect on the second player resulting from performance of the game actions by the second player to reach the objective in the game.

14. The computer readable medium of claim 11, wherein the first elevation is higher than the second elevation, and the adjusting the physical activity rating of select ones of the respective plurality of game actions based on the difference between the first elevation and the second elevation includes increasing the physical activity rating of select ones of the plurality of games actions to be accomplished by the second player relative to the physical activity rating of select ones of the plurality of game actions to be accomplished by the first player.

15. The computer readable medium of claim 14, wherein the physical activity rating of select ones of the plurality of game actions to be accomplished by the second player is increased relative to the physical activity rating of select ones of the plurality of game actions to be accomplished by the first player so as to define an activity adjustment gap, the activity adjustment gap being configured to compensate for the difference in elevation between the first elevation and the second elevation so that the game actions to be performed by the second player to reach the objective in the game feel approximately the same as the game actions to be performed by the first player to reach the objective in the game.

16. The computer readable medium of claim 11, wherein the adjusting the physical activity rating of select ones of the respective plurality of game actions based on the difference between the first elevation and the second elevation includes adjusting the physical activity rating of select ones of the plurality of games actions to be accomplished by the first player and adjusting the physical activity rating of select ones of the plurality of game actions to be accomplished by the second player.

17. The computer readable medium of claim 16, wherein the physical activity rating of select ones of the plurality of game actions to be accomplished by the first player and the physical activity rating of select ones of the plurality of game actions to be accomplished by the second player are adjusted so as to define an activity adjustment gap, the activity adjustment gap being configured to compensate for the difference in elevation between the first elevation and the second elevation so that a physiological effect on the first player resulting from performance of the game actions by the first player to reach the objective in the game is approximately the same as the physiological effect on the second player resulting from performance of the game actions by the second player to reach the objective in the game.

18. The computer readable medium of claim 17, wherein the first elevation is higher than the second elevation, and the activity adjustment gap is defined by decreasing the physical activity rating of select ones of the respective plurality of game actions to be accomplished by the first player and increasing the physical activity rating of select ones of the respective plurality of game actions to be accomplished by the second player.

19. The computer readable medium of claim 17, wherein the first elevation is higher than the second elevation, and the activity adjustment gap is defined by decreasing the physical activity rating of select ones of the respective plurality of game actions to be accomplished by the second player and increasing the physical activity rating of select ones of the respective plurality of game actions to be accomplished by the first player.

20. The computer readable medium of claim 11, further comprising:
updating the first path to be traversed by the first player to reach the objective in the game and updating the second path to be traversed by the second player to reach the objective in the game, each of the updated first path and the updated second path includes a respective plurality of updated game actions to be accomplished by the first player and the second player; and adjusting a physical activity rating of select ones of the respective plurality of updated game actions based on a difference between the first elevation and the second elevation.

\* \* \* \* \*